United States Patent [19]

Buckley

[11] Patent Number: 5,085,098
[45] Date of Patent: Feb. 4, 1992

[54] STEERING WHEEL COVER HAVING A PRAYER COUNTER MECHANISM THEREON

[76] Inventor: Larry J. Buckley, 19323 Surrey La., Northville, Mich. 48167

[21] Appl. No.: 633,077

[22] Filed: Dec. 24, 1990

[51] Int. Cl.⁵ .................. B02D 1/06; G05G 1/10
[52] U.S. Cl. .................................. 74/558
[58] Field of Search .......................... 74/558.5

[56] References Cited

U.S. PATENT DOCUMENTS 2,972,819  2/1961  Graham .................. 74/558 X
3,489,031  1/1970  Meier .................... 74/558

*Primary Examiner*—Dirk Wright
*Attorney, Agent, or Firm*—Charles W. Chandler

[57] ABSTRACT

The cover for an autombile steering wheel has a circumferential array of protuberances than can serve as counting members. A motorist is enabled to move his/her finger along the protuberances to facilitate the process of praying the Rosary (while the automobile is stationary or moving). The protuberances are spaced in groups so that the person can sense by the spacing which prayer is the next prayer to be prayed.

10 Claims, 1 Drawing Sheet

STEERING WHEEL COVER HAVING A PRAYER COUNTER MECHANISM THEREON

BACKGROUND AND SUMMARY OF THE INVENTION

This invention relates to a counting means carried on an automobile steering wheel cover for enabling a motorist to pray the Rosary while driving, or sitting in the automobile. In its preferred form, the invention comprises a series of raised protuberances on the upper surface of a steering wheel cover, whereby a motorist's finger tip can be progressively moved along (around) the cover while saying the Rosary prayers. The protuberances are arranged in spaced groupings according to the different prayers that make up the Rosary, such that the motorist can run his/her finger along the protuberances as a reminder of the next prayer that needs to be prayed at any one time. The use of protuberances on a steering wheel cover permits the prayer-counting process to be accomplished during the driving task. The motorist can keep his eyes on the road while at the same time praying the Rosary.

For the purpose of further describing what is involved in "praying the Rosary", the following are the steps involved in the recognized procedure used in praying the Rosary:

1. Make the Sign of the Cross and say the "Apostle's Creed."
2. Say the "Our Father."
3. Say three "Hail Marys."
4. Say the "Glory be to the Father."
5. Announce the First Mystery; then say the "Our Father."
6. Say ten "Hail Marys," while meditating on the Mystery.
7. Say the "Glory be to the Father."
8. Announce the Second Mystery; then say the "Our Father." Repeat 6 and 7 and continue with Third, Fourth and Fifth Mysteries in the same manner.

The present invention involves a modification of a conventional steering cover by adding protuberances on the wheel cover grouped and spaced according to the various prayer groupings contained in the Rosary. In preferred practice of the invention, a single protuberance (counter) represents the Apostles Creed (step 1), a single protuberance represents the Our Father (step 2), three protuberances represent the three Hail Marys (step 3), ten protuberances represent the ten Hail Marys (step 6), and five protuberances represent the five Mysteries (steps 5 and 8). The various protuberances are spaced from each other around the circumference of the steering wheel cover to enable the motorist to distinguish one prayer from another so that he/she can determine the next prayer to be prayed. An additional protuberance (counter) could be provided to represent step 7. However, that prayer is a relatively short prayer requiring only a few moments time; hence, the saying of that prayer without using a counter would not ordinarily cause the person to forget his/her place in the Rosary prayer sequence.

Some persons may prefer to count the prayers with his/her right hand, while other persons may prefer to count the prayers with his/her left hand. Therefore, in the preferred practice of the invention, two sets of counter protuberances are symmetrically positioned on the wheel cover surface (one set extending along the right hand side of the cover, and the other set extending along the left hand side of the cover).

In carrying out the invention, I prefer to use a conventional steering wheel cover modified only to the extent necessary to provide the counter protuberances on the wheel cover surface. Although the preferred cover has a symmetrical arrangement of counter elements for using either the left or right hands, the arrangement can be mounted along only one side of the steering wheel's vertical axis.

I am not aware of any prior art showing steering wheel covers having counter protuberances thereon.

IN THE DRAWINGS

DESCRIPTION OF A PREFERRED EMBODIMENT OF THE INVENTION

Figure 2:
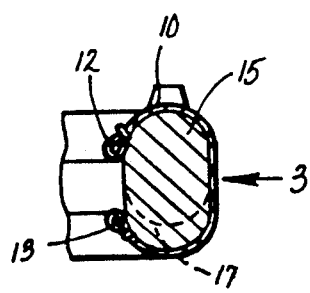
FIG. 2 is an enlarged sectional view taken on line 2—2 in FIG. 1, and showing the cross-sectional configuration of the associated steering wheel.

The drawings show an automobile steering wheel cover 10 formed out of a flexible material, e.g. cloth, flexible plastic material or leather. Two endless elastic cord members 12 and 13 are incorporated into edge areas of the cover member to cause it to encircle and follow the cross-sectional shape of the steering wheel. As shown in FIG. 2, the flexible cover member assumes a C-shaped cross-sectional configuration in partial encirclement on a steering wheel 15. The web of the C-shaped cross-section lies against the outer side surface of wheel 15, whereas the flanges of the C-shaped cross-section extend along the upper surface and undersurface of the wheel. The undersurface of the steering wheel usually has an undulating surface contour, as shown at 17 in FIG. 3. Cover 10 is in a semi-taut condition so that it engages only the peaks of the undulations.

My invention is concerned with a prayer counting means carried on the steering wheel cover for enabling the motorist to pray the Rosary while driving the automobile, or while sitting in the automobile during a waiting period.

Figure 1:
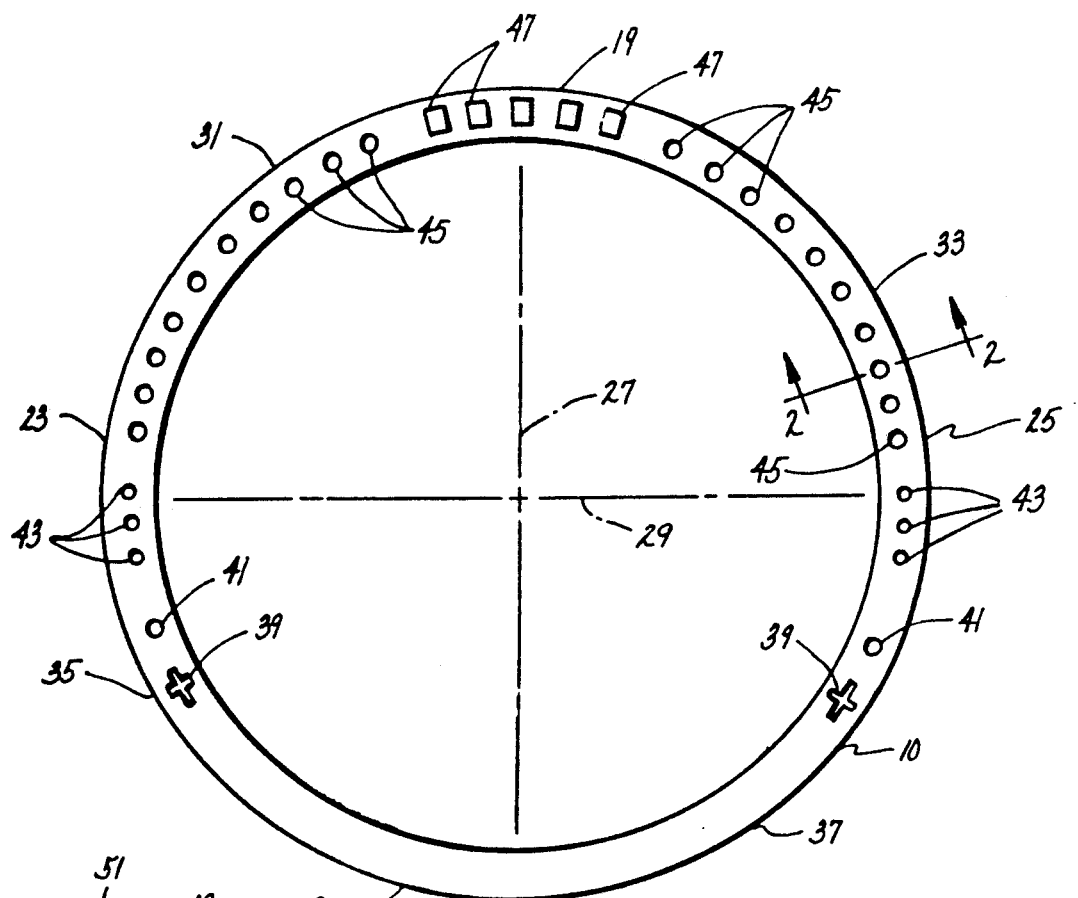
FIG. 1 is a plan view of a steering wheel cover embodying the present invention.

FIG. 1 is a plan view of the steering wheel cover as it would be seen by the motorist when seated in the driver's seat of the automobile. The annular cover has an upper circular outer edge 19, a lower circular outer edge 21, a left circular outer edge 23, and a right circular outer edge 25. For explanation purposes, two centerlines 27 and 29 are drawn through the annular cover member space to subdivide the cover member into four quadrants, namely an upper left quadrant 31, an upper right quadrant 33, a lower left quadrant 35, and a lower right quadrant 37. Protuberances are formed on the upper surface of the cover member in different ones of the four quadrants, the protuberances representing different prayers to be said when praying the Rosary. FIG. 1 indicates the spacing of the different protuberances around (along) the upper surface of the cover.

The protuberances are used as counters to indicate the person's progress in praying the Rosary. The person's finger engages an individual protuberance while a particular prayer is being said, aloud or in silence. As that prayer is finished, the person shifts his/her finger to the next protuberance. The sequence begins at the lower-most protuberance 39 in either the lower left quadrant or the lower right quadrant.

If the person is left-handed, he/she will use the protuberances to the left of vertical centerline 27. If the person is right-handed, he/she will use the protuberances to the right of vertical centerline 27. The protuberances in the two left quadrants 31 and 35 are mirror images of the protuberances in the two right quadrants 33 and 37.

The protuberances are arranged in different groups spaced around cover 10 circumference so that the protuberances can be distinguished from one another by physically sensing the spacing with the fingers. The person can use the spacing to gain an understanding of the next prayer that needs to be said (or mentally visualized) in order to recite the Rosary.

In each of the two lower quadrants 35 and 37, a single protuberance 39 represents the Apostles Creed (a prayer used in the Rosary), a single protuberance 41 represents the Our Father (another prayer), and three closely-spaced protuberances 43 represent the Hail Mary (another prayer that is used when praying the Rosary).

In each of the two upper quadrants, there are ten closely-spaced protuberances 45 representing a decade of Hail Marys in the Rosary. The motorist recites the individual prayers, aloud or in silence, beginning with the Apostles Creed (protuberance 39) and proceeding through the other prayers in sequence. As each prayer is completed, the motorist shifts his/her hand so that the tip of the thumb is advanced from one protuberance to the next protuberance.

The Rosary is prayed so that an Our Father and the decade of Hail Marys (protuberances 45) is repeated five times. Thus, after finishing the last Hail Mary in a decade (last protuberance 45), the person shifts his first finger to protuberance 45 and begins a new decade after saying the "Our Father". This process is repeated until the person has completed five decades. Each decade is termed a "Mystery" or meditation on a particular theme.

In FIG. 1, there are five other circumferentially-spaced protuberances 47 spanning quadrants 31 and 33. These protuberances represent the five Mysteries. A person praying the Rosary can have the first finger of one hand on a selected one of protuberances 47, while he/she is progressively advancing the other hand along protuberances 45. This makes it easier for the person to mentally keep track of his/her progress. As shown in FIG. 1, each protuberance 47 has a rectangular configuration. However, each protuberance 47 could have a numerical shape, e.g. the number "one", the number "two", etc. up to "five".

Figure 3:
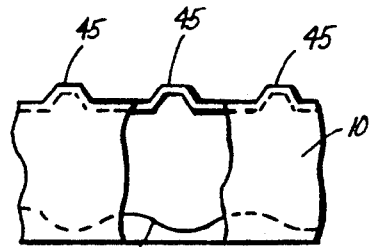
FIG. 3 is a fragmentary side elevational view of the FIG. 2 cover taken in the direction of arrow 3 in FIG. 2, with a portion of the cover broken away to illustrate a structural detail.

FIG. 3 shows individual protuberances formed integrally with cover member 10. However, the protuberances could be attachments to a conventional cover. Each protuberance could be glued or sewn onto the cover material. The protuberances could take the form of headed rivets or buttons. The protuberances are not necessarily the same size or shape. As shown in FIG. 1, protuberance 39 has a cross shape, whereas protuberances 41, 43 and 45 have circular shapes.

Figure 4:
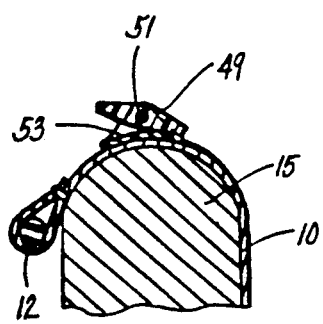
FIGS. 4 and 5 are views taken in the same direction as FIG. 2, but showing different counter constructions.

FIG. 4 illustrates an alternative protuberance construction. In this case a representative protuberance comprises a small lever element 49 having a pivotable connection 51 with a mounting element 53 that is affixed to the surface of cover 10. As the person completes the prayer represented by the protuberance, he/she presses lever element 49 to a tilted condition that distinguishes that protuberance from the remaining protuberances in the series. This makes it somewhat easier for the person to know the current progress without having to continually keep his/her hands at specific locations on the steering wheel cover.

Figure 6:
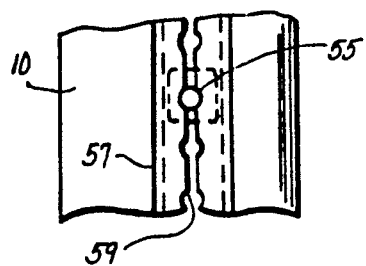
FIG. 6 is a fragmentary bottom view of the FIG. 5 construction.
Figure 5:
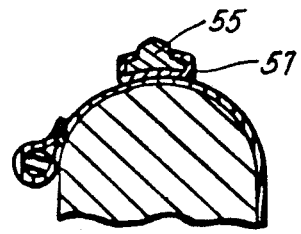

FIGS. 5 and 6 show a variation of the FIG. 4 concept. In this case, the protuberance is formed as a slide element 55 movably mounted in a track 57 carried on cover member 10. The track has a slot 59 extending therealong for accommodating the protruding portion of the protuberance. At spaced points along its length, the slot is widened to form a protuberance locator. The person pushes element 55 along the track from one location to the next location. As element 55 reaches each locator point, the resistance to slide movement decreases so that the protuberance snaps into place at that location point.

The arrangement of FIG. 5 and 6 would have principal usage for defining protuberances 43, 45 and 47, i.e. where there are multiple protuberance locations to be selectively utilized.

The drawings show specific forms and features of the invention. However, it will be appreciated that the invention can be practiced in various different forms and configurations. For example, it is believed that the invention could be configured as a prayer identifier (counter) mechanism for prayers other than the Rosary prayers.

Therefore I claim:

1. An automobile steering wheel cover comprising an annular flexible cover member adapted to assume a circular plan configuration when placed on a steering wheel; said annular cover member having a left upper quadrant, a left lower quadrant, a right upper quadrant, and a right lower quadrant; means carried by said cover member for counting prayers with either right or left hands during the process of praying the Rosary; said counting means comprising single circumferentially-spaced protuberance counter locations in the lower left quadrant and in the lower right quadrant representing the Apostles Creed and the Our Father; said counting means further comprising three additional circumferentially-spaced protuberance counter locations in the lower left quadrant and in the lower right quadrant representing the Hail Mary; said counting means also comprising ten different circumferentially-spaced protuberance counter locations in the upper left quadrant and in the upper right quadrant representing a decade of the Hail Mary.

2. The steering wheel cover of claim 1, wherein each counter location consists of an individual raised protuberance on the surface of the cover member.

3. The steering wheel cover of claim 1, wherein each counter location consists of an individual raised protuberance on the surface of the cover member; said protuberances being oriented so as to be located on the upper surface of the steering wheel when the cover member is placed thereon.

4. The steering wheel cover of claim 3, wherein said protuberances are integrally formed with the cover member.

5. The steering wheel cover of claim 1, wherein the counter locations in the two left quadrants are mirror images of the counter locations in the two right quadrants, whereby the motorist can use either the right hand or left hand when counting the prayers.

6. The steering wheel cover of claim 5, and further comprising five other circumferentially-spaced protuberance counter locations spanning the upper left quadrant and the upper right quadrant, said five other counter locations representing five Mysteries of the Rosary.

7. The steering wheel cover of claim 6, wherein each counter location consists of a raised protuberance on the surface of the cover member; the protuberances representing the Apostles Creed having a different configuration than the remaining protuberances.

8. An automobile steering wheel cover comprising an annular flexible cover member adapted to assume a circular plan configuration including four quadrants when placed on a steering wheel; and multiple counter locations spaced along said cover in all four quadrants, each counter location representing a prayer to be prayed while a motorist has his/her hands gripping the cover, whereby the motorist is enabled to determine which prayer in a given sequence of prayers is to be prayed at any given time.

9. The steering wheel cover of claim 8, wherein said counter locations have a variable spacing, with a first plurality of counter locations being closely spaced together to constitute one group of prayer identifiers, and a second plurality of counter locations being closely spaced together to constitute another group of prayer identifiers.

10. The steering wheel cover of claim 9, wherein there are three counter locations in said one group of prayer identifiers, and ten counter locations in said another group of prayer identifiers.

* * * * *